(12) United States Patent
Koster (10) Patent No.: US 8,113,845 B2
(45) Date of Patent: Feb. 14, 2012

(54) METHOD AND SYSTEM FOR MAINTAINING INJECTION REMINDERS VIA STUFFED DOLL

(76) Inventor: Erika S. Koster, Minneapolis, MN (US)

( * ) Notice: Subject to any disclaimer, the term of this patent is extended or adjusted under 35 U.S.C. 154(b) by 480 days.

(21) Appl. No.: 12/369,468

(22) Filed: Feb. 11, 2009

(65) Prior Publication Data

US 2010/0203489 A1   Aug. 12, 2010

(51) Int. Cl.
*G09B 23/28* (2006.01)
(52) U.S. Cl. ........................................................ 434/267
(58) Field of Classification Search .................. 434/236, 434/262, 267, 268, 272; 446/295, 296
See application file for complete search history.

(56) References Cited

U.S. PATENT DOCUMENTS

| | | | | |
|---|---|---|---|---|
| 3,999,504 A * | 12/1976 | Kearse | ........................ | 116/325 |
| 4,349,338 A * | 9/1982 | Heppler | ........................ | 434/262 |
| 4,822,285 A * | 4/1989 | Summerville | ................ | 434/272 |
| 5,314,339 A * | 5/1994 | Aponte | ........................ | 434/267 |
| 5,411,437 A | 5/1995 | Weber et al. | | |
| 5,788,505 A | 8/1998 | Sharkey | | |
| 5,795,157 A * | 8/1998 | Weber et al. | .................. | 434/269 |
| 5,842,870 A * | 12/1998 | Cramer | ......................... | 434/267 |
| 6,004,136 A * | 12/1999 | Ehrenpreis | .................... | 434/262 |
| 6,024,723 A | 2/2000 | Cota | | |
| 7,534,107 B2 * | 5/2009 | Bardsley et al. | ............. | 434/272 |
| 2004/0161732 A1 * | 8/2004 | Stump et al. | ................ | 434/262 |
| 2010/0015590 A1 * | 1/2010 | Kiss | ............................ | 434/267 |

* cited by examiner

*Primary Examiner* — Kurt Fernstrom
(74) *Attorney, Agent, or Firm* — Barbara A. Wrigley; Oppenheimer Wolff & Donnelly, LLP (57) ABSTRACT

The present invention provides for a system and method for keeping injection reminders via stuffed doll. A stuffed doll is configured to receive a plurality of needles and a plurality of markers on the entirety of its body. The needles' locations on the stuffed doll may represent reminders of injection sites on the patient's body. The needles may represent past, current, or future injection sites, or any combination thereof. The needles may further comprise different distinctive qualities, such as thickness and changeable day of the week indicators or colors, allowing the needles to represent different injection types or times. Each needle may still further include blank labels on which a patient can record details pertinent to the specific injection instance. The markers' locations on the stuffed doll may represent reminders of future injection sites on the patient's body. The markers may further comprise different distinctive qualities and include blank labels as described with the needles above.

22 Claims, 8 Drawing Sheets

METHOD AND SYSTEM FOR MAINTAINING INJECTION REMINDERS VIA STUFFED DOLL

FIELD OF THE INVENTION

The present invention relates generally to the medical arts, and more specifically to a device for maintaining a record of the rotation of injection sites in an injection regimen.

BACKGROUND OF THE INVENTION

A large number of individuals are afflicted with diseases or other conditions requiring repeated administration of injections or medications. Injections are often safer, more effective, and more comfortable if they can be applied in a different site of the body for each injection. However, it can be difficult for patients or caregivers to remember where and when they last injected a medication, particularly if the patient is afflicted with a disease requiring large numbers of repeat injections, such as diabetes or multiple sclerosis. One result of repeatedly injecting a site before the patient's body part has healed is that the affected area can develop calluses, scars or nodules which ultimately prevent the medication from effectively entering the patient or from entering the patient's body at all. Injection site reactions are often a reason patients cite for discontinuing a prescribed injection regimen. Therefore, reminder systems have been developed in an effort to minimize the adverse effects of an injection regimen.

One existing reminder system involves a patient or caregiver using a checklist on a piece of paper to track rotation among injection sites. The patient or caregiver may list future injection sites, and cross out past injection sites that have already been injected. However, such checklists can be difficult or burdensome to use, particularly for children, because checklists require organization and responsibility. Indeed, younger children often have not yet developed the ability to distinguish between the left and right sides of their body. Furthermore, children may quickly tire of an organizational system perceived as "boring." Even if an adult caregiver applies injections for children, such children are less likely to be emotionally accepting of the medication process with such an apparatus that does not make tracking injection sites simple, attractive and understandable.

Another existing reminder system is a plastic pillbox with dividers representing days of the week, days of the month, times of the day, or a combination thereof. However, such systems are not conducive to injection medications.

Accordingly, there is a need in the art for a system and method that is simple, intuitive, and convenient to use, to track methodically prior injection sites and remind the patient or caregiver where to make the next successive injection. There is a further need for a system that supports flexibility in the rotation, timing, location, and type of injection sites. There is a still further need for a system that is attractive and fun, and that encourages children and adults to continue use of the reminder system. Such a system would also encourage patients to continue using the underlying medication at the appropriate dosages and may minimize side effects associated with the medication.

BRIEF SUMMARY OF THE INVENTION

The present invention provides a stuffed toy with needles for use as a reminder system for a child or adult patient or caregiver to track medication injection sites. The stuffed toy may be a doll including a body having a head, torso, arms, and legs. In accordance with one aspect of the present invention, the entirety of the stuffed doll may accept a plurality of needles which may remind the patient or caregiver where and when prior injections have been administered previously. The needles may be stuck or otherwise inserted in the stuffed doll in locations corresponding to where the medication was administered on the patient's body.

In accordance with another aspect of the present invention, the needles may include labels, colors or other markings which represent the time and type of the past injections.

In accordance with a further aspect of the present invention, the stuffed toy or doll may accept a plurality of markers for use as future reminders of where and when the next successive injections should occur. In an exemplary embodiment, the markers may be comprised of a hook-and-loop fastener material such as Velcro®. The markers may be placed on the stuffed doll in locations corresponding to where future injections will be administered on the patient's body. The markers may be labeled, the labels comprising a number or letter indicator representing a sequential order in which the patient or caregiver should administer future injections. In accordance with a still further aspect of the present invention, the markers may comprise labels, colors or other distinctive markings that track the time and type of the next successive injections.

In accordance with a method of the present invention, a method is disclosed for rotating medication sites. The method includes the steps of: providing a body of a stuffed doll having a head, torso, arms, and legs, the entire body being configured to receive at least one of a plurality of needles for use in reminding the patient or caregiver of where past injections or medications have been administered; selecting an appropriate injection region by selectively rotating injection regions from previous selections as shown by needles stuck into the body of the stuffed doll; and administering the medication to the selected region on the patient's body.

DETAILED DESCRIPTION OF THE INVENTION

The present invention will be described in detail with reference to the figures below. The invention generally relates to a system and method for maintaining a temporary record of the rotation of injections or medications. The principles of the invention are described in one exemplary embodiment for a diabetic patient self-administering insulin and drawing blood, but those skilled in the art will appreciate that these principles may readily be applied for other injection/blood draw regimens.

In an exemplary embodiment of the present invention, a toy may be configured to represent a patient's body. The toy may take any number of forms while still remaining within the scope of the present invention; the shape of the toy may be a doll or any object that bears a resemblance of a person or otherwise conveys the likeness of those areas of a person's body or extremities that may receive an injection. In one embodiment, the toy may be a stuffed object that includes a body comprising a head, torso, arms and legs.

Figure 1A:
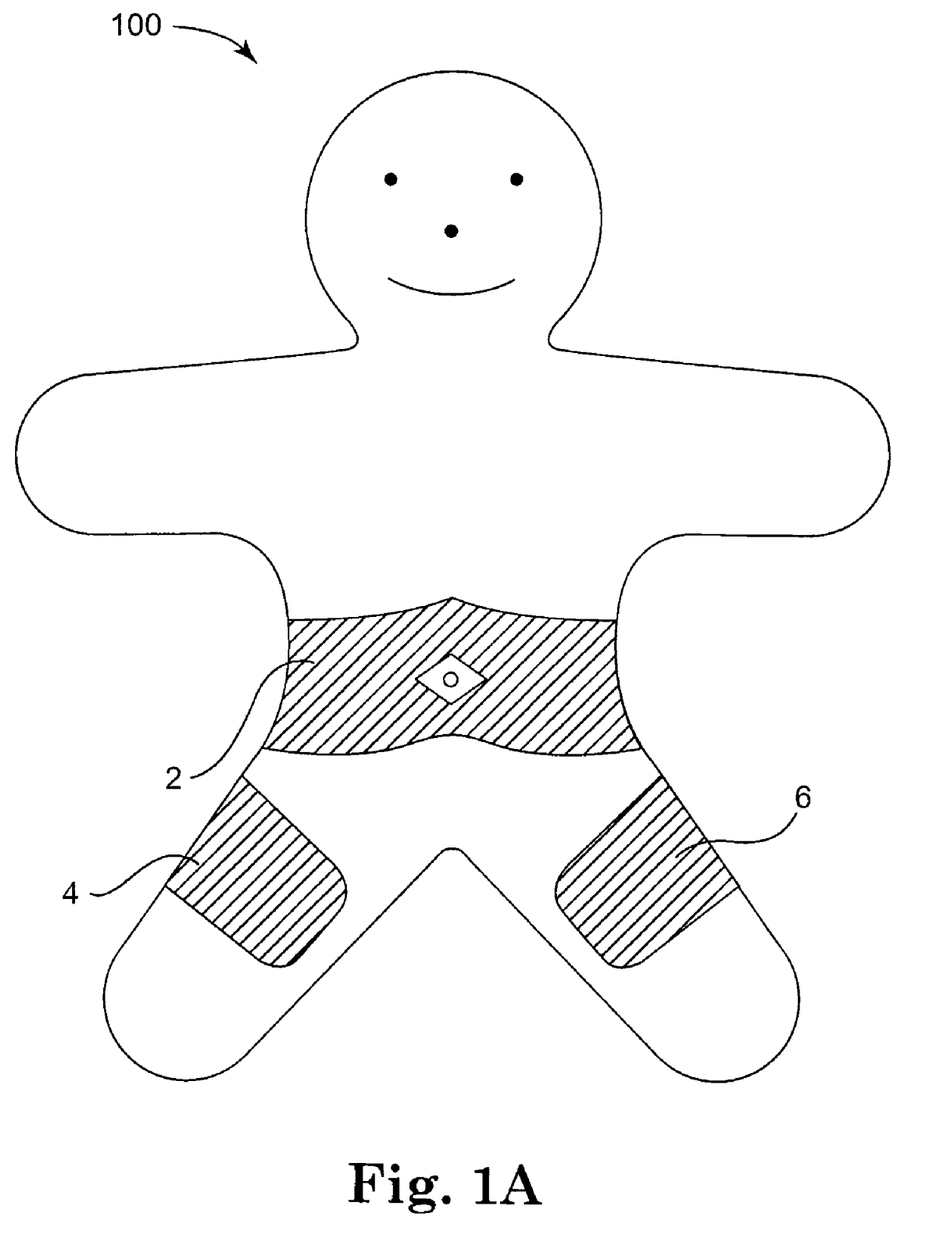
FIG. 1A is a perspective view of a front side of the stuffed doll in accordance with one embodiment of the present invention.
Figure 1B:
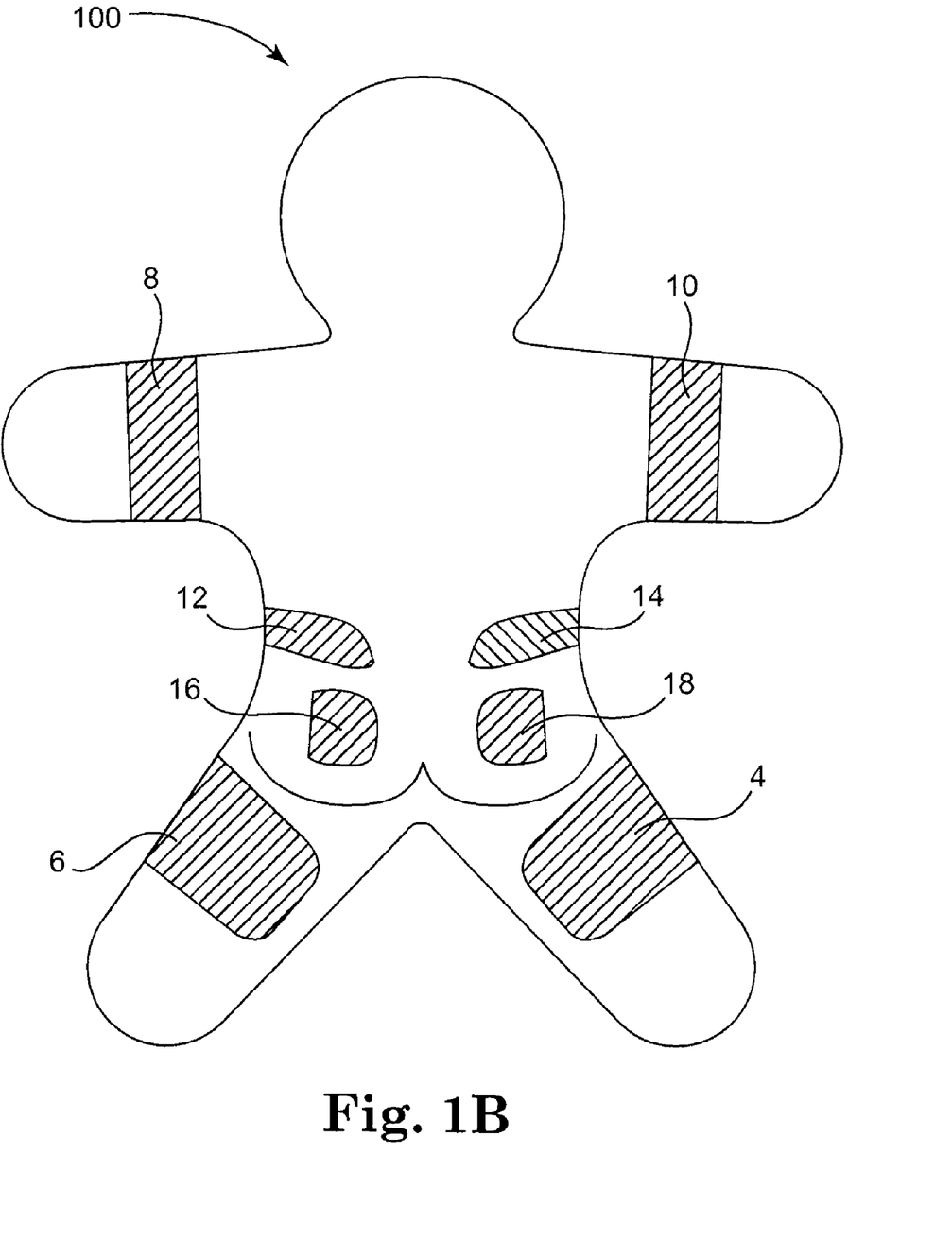
FIG. 1B is a perspective view of the back side of the stuffed doll in FIG. 1A in accordance with one embodiment of the present invention.

Referring to FIGS. 1A and 1B, a stuffed doll 100 in accordance with the present invention is shown. The doll may include areas that correspond suitable injection sites on the patient's body. In one embodiment, the areas include abdomen area 2 (not including the umbilicus or the "belly button"), right thigh area 4, left thigh area 6, left arm upper/outer area 8, right arm upper/outer area 10, left lower back area 12, right lower back area 14, left buttocks area 16, and right buttocks area 18. These injection areas 2-18 of the doll 100 may be indicated in a variety of ways, such as a different colors for the areas, different fabrics with varying textures for the areas, outlines of the different areas with without descriptive words or symbols in the area, or any other suitable means for conveying the injection sites. As will be appreciated by one skilled in the art, the stuffed object may provide for further or different relevant injection sites as appropriate for the given injection regimen and treatment being administered.

Figure 2A:
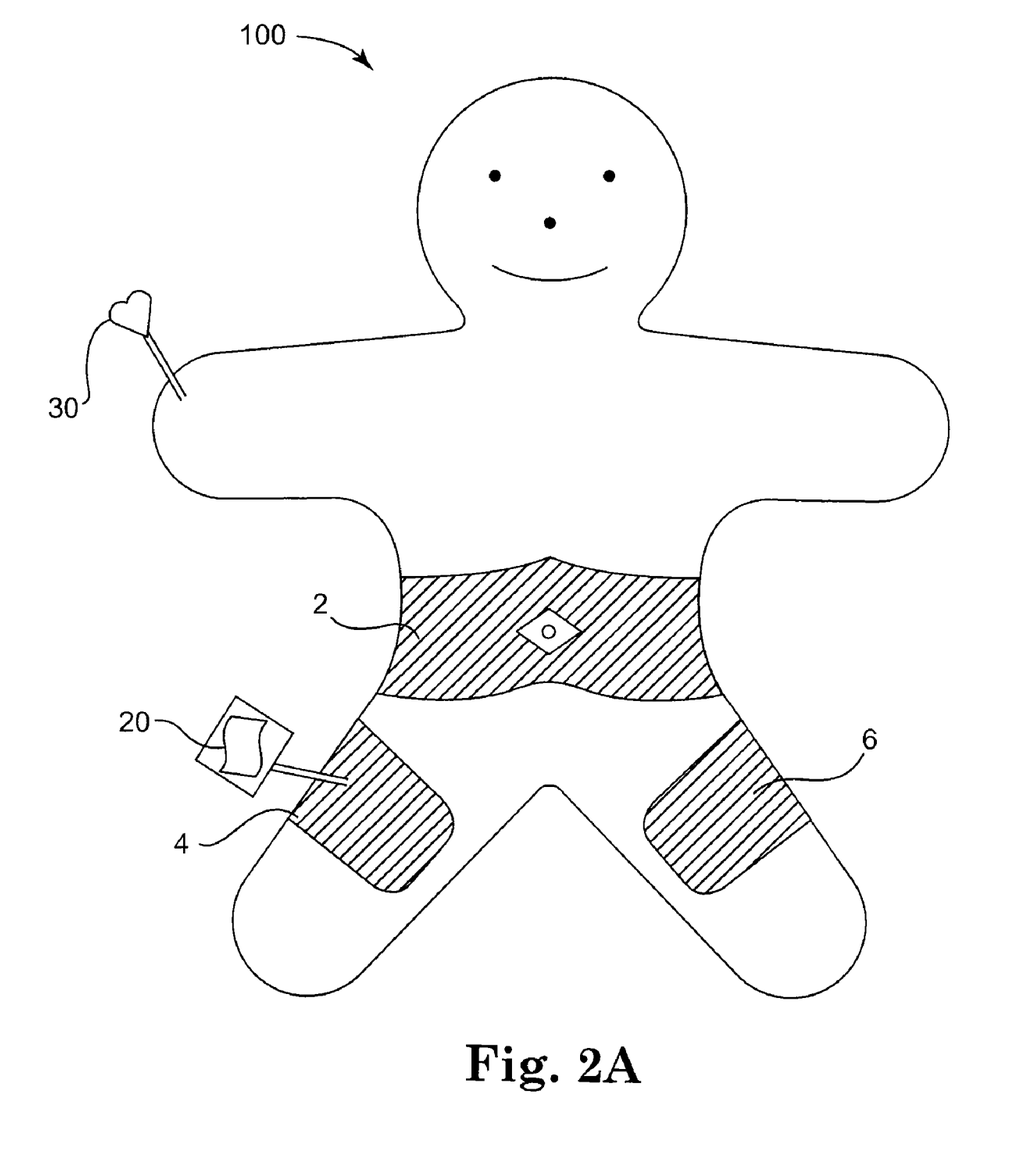
FIG. 2A is a perspective view of the front side of the stuffed doll in FIG. 1A demonstrating operation of the stuffed doll and needles in accordance with one embodiment of the present invention.

In one embodiment, the present invention maintains a record of past injections through the use of a plurality of needles, pins, stickpins, or the like. Referring now to FIG. 2A, at least one of the plurality of needles 20, 30 may be placed on or into a stuffed doll in a location corresponding to a site where a prior injection was administered on the patient's body, as shown in FIG. 2A. The use of said needles 20. 30 aids in remembering where the patient or caregiver has administered medication. In a further embodiment, the needles 20. 30 may be differently shaped or colored, or may contain labels on which a patient can record more specific information. For example, the patient or caregiver may record the date and time of the injection or the type of medication administered. Alternatively, a needle color or label color, or other identifying feature, might represent both a type of injection and a time at which the medication was administered. For example, yellow needles could represent insulin injections administered in the morning. Alternatively, an indicator on the needle may be adjusted to indicate the day of the week an injection was last given.

As will be appreciated by one skilled in the art, the plurality of needles alternatively may be used in a reminder system to track current or future injection sites in lieu of past injection sites, or a combination of past, current, and future injection sites.

Figure 2B:
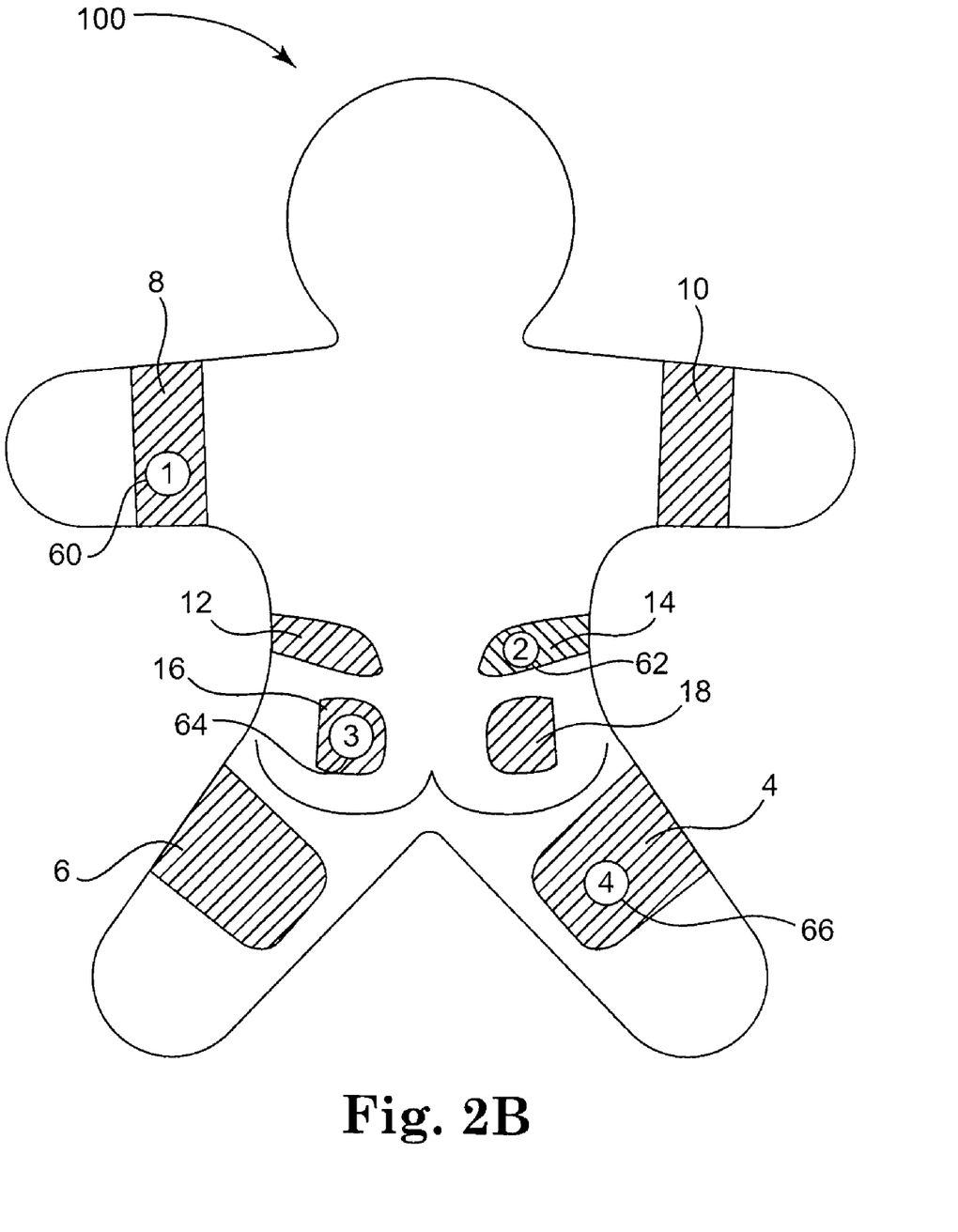
FIG. 2B is a perspective view of the back side of the stuffed doll in FIG. 1A demonstrating operation of the stuffed doll and markers in accordance with one embodiment of the present invention.

In another embodiment, the present invention manages a record of a plurality of past or future injections through the use of a plurality of markers. Referring now to FIG. 2B, at least one of the plurality of markers 60, 62, 64, 66 may be used in a method similar to the plurality of needles, to track a plurality of future injection sites, as shown in FIG. 2B. The markers may comprise a hook-and-loop fastener material such as Velcro®, to allow the markers to adhere temporarily but flexibly to the stuffed doll. The markers may also take other forms, including any object that is configured to adhere or otherwise maintain its position on the doll. The plurality of markers may be labeled in a manner allowing the patient to place a plurality of markers on the stuffed doll to denote a sequential order for future injection sites. In an exemplary embodiment, such labels may comprise numbers or letters to denote a sequential order for future injection sites. In a further embodiment of the present invention, the markers may be differently shaped or colored, or may contain labels, on which a patient can record more specific details or information about the specific injection instance.

Figures 3A, 3B:
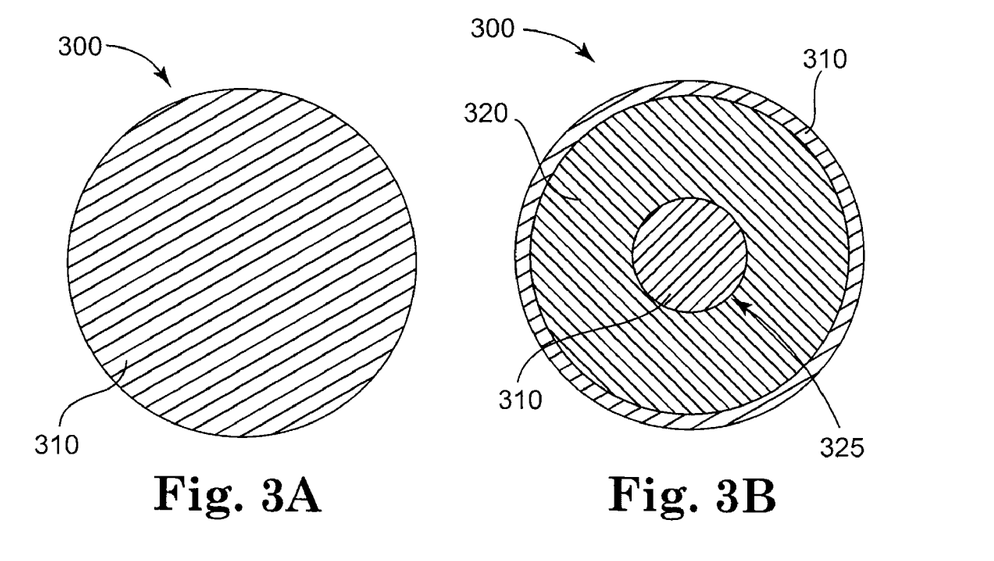
FIGS. 3A and 3B are a front view and a back view respectively of a marker 300 in accordance with one embodiment of the present invention.

Referring now to FIGS. 3A and 3B, in a yet a further embodiment of the present invention, the markers may be configured to contain an area in its center that is free of hook-and-loop fastener material, in order to allow a needle to be inserted more freely into the marker in the area void of the fastener material. FIG. 3A is a front view of marker 300 and FIG. 3B is a back view of marker 300. Marker 300 includes a first layer 310, as shown in FIG. 3A, which is visible to the patient when the marker is applied to the stuffed doll and may include descriptive information or color relating to an injection. First layer 310 may be made of a fabric, plastic, or other suitable material for displaying the relevant descriptive information or color correlating to an injection, and may be made of a material that is readily pierced by a needle or pin marker. Marker 300 further includes a second layer 320 adhered or otherwise attached to a back side of first marker layer 310 as shown in FIG. 3B. Second layer comprises a hook-and-look fastener material, or another suitable material to maintain the marker to the surface of the stuffed doll. Second layer 320 may be circular, or another suitable shape, and includes a void 325 that allows a portion of the back side of the first layer 310 to show therethrough, as seen in FIG. 3B.

Figures 3C, 3D:
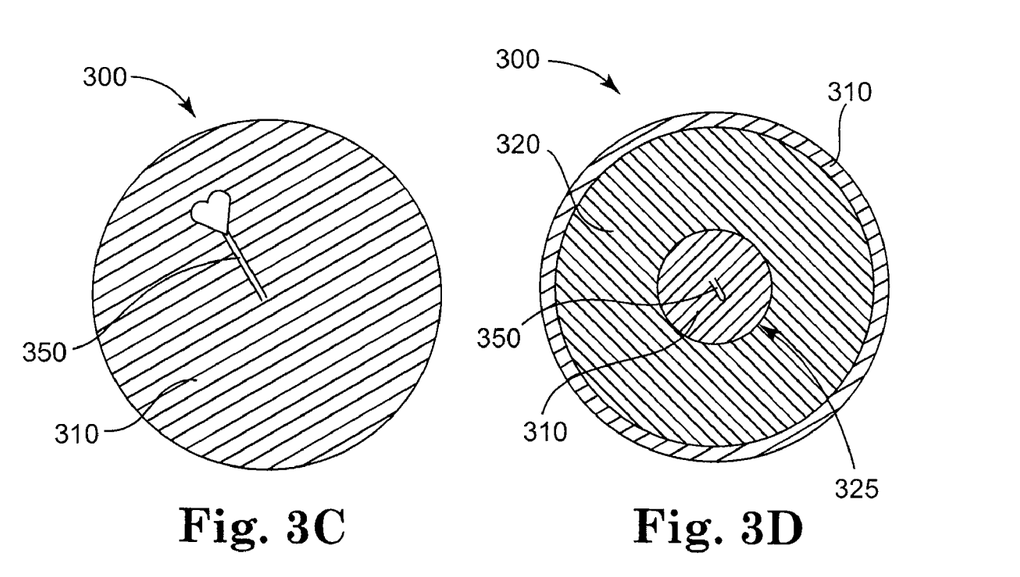
FIGS. 3C and 3D are a front view and a back view respectively of a marker 300 in operation with needle 350 inserted therethrough in accordance with one embodiment of the present invention.

In operation, marker 300 is applied to the stuffed doll at a location corresponding to an injection site. The front side of first layer 310 of marker 300 is visible and may include descriptive information or color correlating to an upcoming injection at the identified injection site. Referring to FIG. 3C, a needle or pin marker 350 may be inserted and pierce through the first layer 310 in a generally center region of the first layer, whereby the needle extends into the stuffed doll (not shown). Referring to FIG. 3D, the needle 350 extends through layer 310, which is easily pierced, but does not encounter second layer 320 because the needle 350 passes through void 325. With this configuration, one or more markers 300 may be placed on the stuffed doll to indicate future injection sites in accordance with a patient's injection regimen. Upon completion of, or at the time of, an injection, a needle may be inserted through the appropriate marker to indicate that the injection is complete or about to be completed.

Figure 4A:
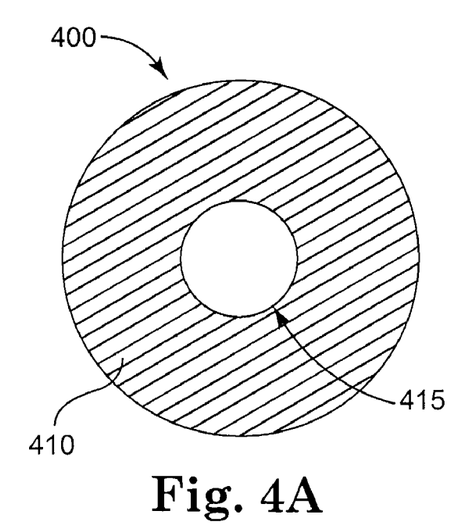
FIGS. 4A and 4B are a front view and a back view respectively of a marker 400 in accordance with one embodiment of the present invention.
Figure 4B:
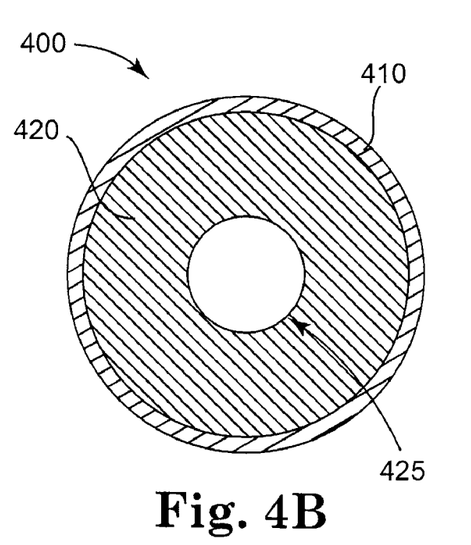

Referring now to FIGS. 4A and 4B, in an alternative embodiment, marker 400 contains two layers: a first layer 410 forming a circular first void 415 in its center region and a second layer 420 including a fastener material having a circular shape with a circular second void 425 with approximately the same diameter as the first void 415 in the center thereby forming a shape similar to a two-dimensional torus, and being adhered or otherwise attached to the first layer. The second layer 420 may be formed from a hook-and-loop fastener material or other suitable material as described above in reference to layer 320, and the first layer 410 may be formed from a fabric or other material for displaying the relevant descriptive information or color correlating to an injection.

Figure 4C:
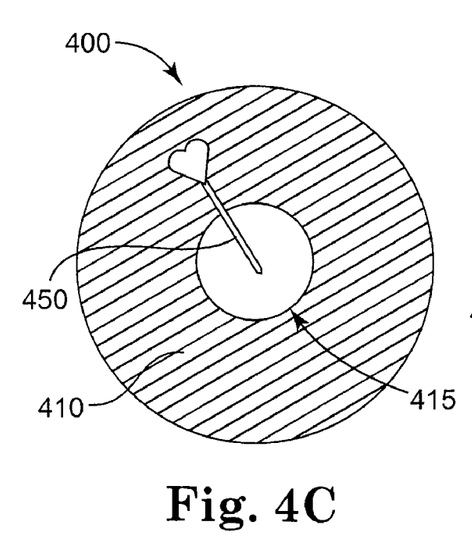
FIGS. 4C and 4D are a front view and a back view respectively of a marker 400 in operation with needle 450 inserted therethrough in accordance with one embodiment of the present invention.
Figure 4D:
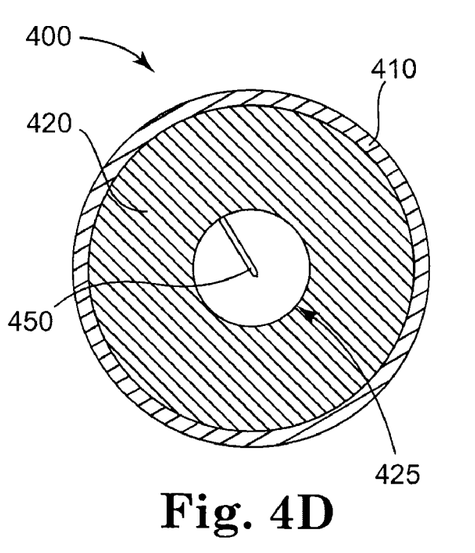

In operation, marker 400 is placed on the stuffed doll in a desired location corresponding to an injection site on the patient. Then, referring to FIGS. 4C and 4D, a needle or pin marker 450 may be inserted through voids 415, 425 and enter directly into the stuffed doll (not shown). At this location the needle 450 does not penetrate marker 400, but merely passes through it, and enters the stuffed doll directly, which is easily pierced by the needle or pin.

In a still further embodiment of the present invention, the patient may employ the flexibility of the plurality of markers to repeat injection sites on the doll's body if those parts are fleshier or more robust against physical effects of repeat injections, such as scarring, nodules, or calluses.

Referring again to FIG. 2A, a stuffed doll 100 for keeping injection reminders is shown in operation. In an exemplary embodiment of the present invention, a patient may administer an injection to himself or herself in the right thigh area. The patient can then use a needle 20 to record the location of the injection on the stuffed doll 100. In this case, the needle 20 is stuck into the right leg of the stuffed doll 100 at the appropriate location corresponding to the injection site on the patient as a reminder that the patient injected himself or herself in the right thigh. Any other numerous injection sites corresponding to any other injection regimen may be employed on the doll. Tracking the locations of prior injection sites allows patients to avoid painful and undesirable scarring, nodules, or calluses that can result from multiple injections into the same body part before the body part has recovered sufficiently to receive additional injections. Accordingly, a plurality of needles may be placed into the doll to correspond to a plurality of injections.

In a further exemplary embodiment, the patient may need to draw blood via finger-prick for glucose testing. For example, the patient may self-administer a finger-prick test on one of the fingers of his or her right hand. After performing the finger-prick procedure, the patient can then use a different needle 30 to record the location of the procedure on the stuffed doll 100.

Figure 5:
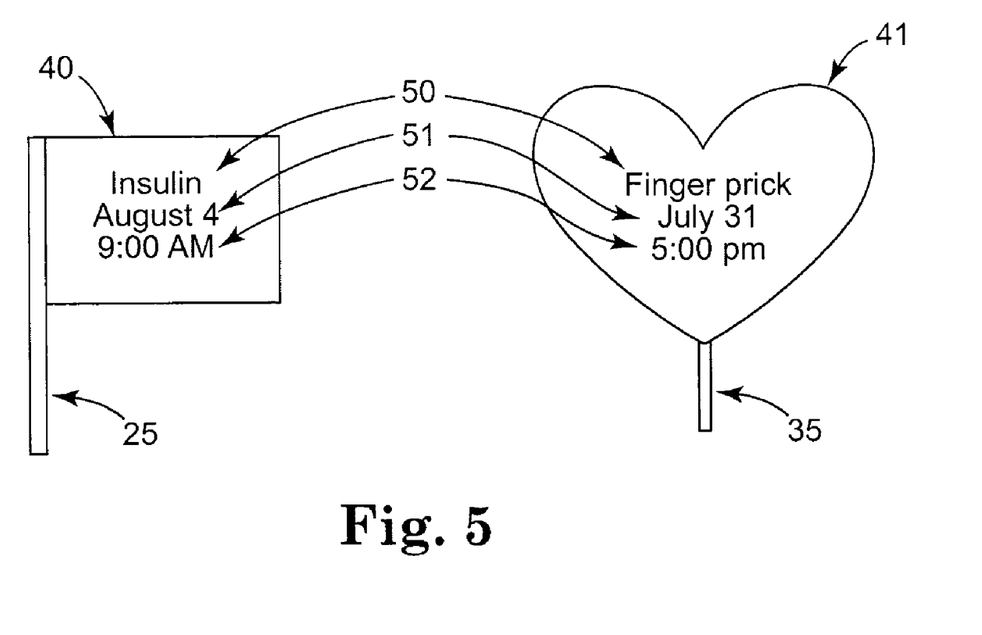
FIG. 5 is a close-up view of two needles in accordance with one embodiment of the present invention.

Referring now to FIG. 5, in a still further embodiment, needles 25 and 35 may represent examples of the needles 20 and 30 respectively, shown in FIG. 2A. Needles 25 and 35 may contain blank labels 40 and 41, on which a patient can record, for example, an injection type 50, the date or day of the week 51 on which the injection was administered, or the time 52 at which the injection was administered. Alternatively, labels 40 and 41 may be preprinted to contain the appropriate information for a specific injection regimen or to contain generic injection information such as day of week or time of day. The needles 25 and 35 may further include labels 40, 41 of different shapes to represent different injections or procedures. For example, a rectangular label 40 may represent an insulin injection whereas a heart-shaped label 41 may represent a blood test such as a finger-prick. Patients are able to record on the labels 40, 41 any details that would be important or useful to remember for a specific injection instance.

Referring now to FIG. 2B, in a yet further embodiment, a patient may wish to remind himself or herself of the desired location of a plurality of future injections. In an exemplary embodiment, a patient may use markers 60, 62, 64, 66 on a stuffed doll 100 to demonstrate that the next injection locations will be on the torso, right arm, torso again, and left leg, respectively. Furthermore, the markers 60, 62, 64, 66 may be labeled with numbers representing a chronological order in which future injections should occur. For example, a first future injection will occur on the torso in accordance with marker 60 labeled with a "1," a second future injection will occur on the right hand in accordance with marker 62 labeled with a "2," a third future injection will occur on the torso in accordance with marker 64 labeled with a "3," and a fourth future injection will occur on the left leg in accordance with marker 66 labeled with a "4." The patient can then record details and information relevant to the future injections on the labels. Alternatively, markers 60, 62, 64, 66 may be employed to be configures as markers 300 or 400 described above so that a needle may be inserted through the marker and into the doll at the time an injection is given.

Furthermore, a patient, recognizing that the abdomen is a fleshier portion of the body to receive injections, and thus recovers faster, may elect to use a plurality of markers, such as markers 60, 62, in the same injection site in the abdomen area 2 as a result. A patient may also wish to avoid or minimize a particular injection site and may accordingly not place markers in that injection site or only place markers in that site rarely. As will be appreciated by one skilled in the art, the markers 60-63 may further contain blank labels similar to those described in needles 25 and 35 in FIG. 1B.

Figure 6:
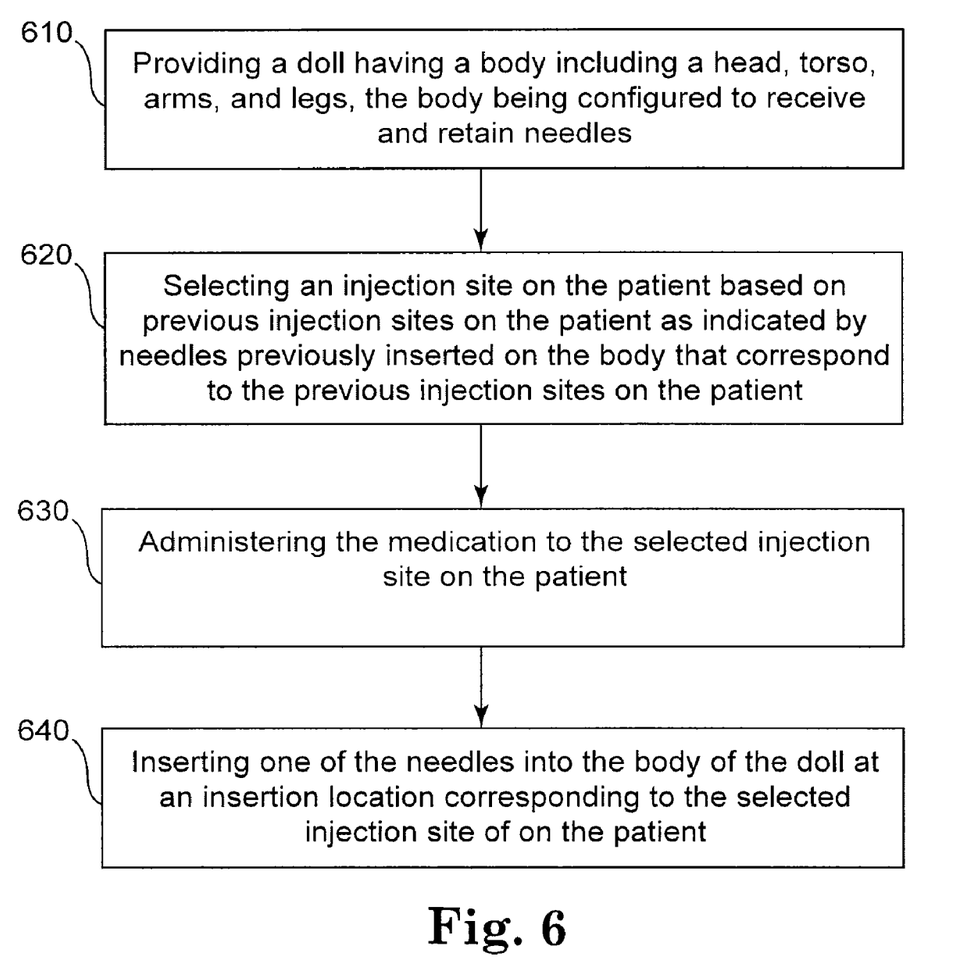
FIG. 6 contains a flowchart of a method for keeping injection reminders via stuffed doll in accordance with one embodiment of the present invention.

Referring now to FIG. 6, a flowchart of a method for keeping injection reminders via a stuffed doll in accordance with one embodiment is shown. The injection reminder process 600 facilitates rotating medication sites for an injection regimen for a patient. At step 610, a doll is provided having a body including a head, torso, arms, and legs, the body being configured to receive and retain needles. Next, an injection site on the patient is selected based on previous injection sites on the patient as indicated by the needles previously inserted in the body that correspond to the previous injection sites on the patient, step 620. This selection may include selecting an appropriate injection site on the patient based on the location of at least one marker on the body of the doll corresponding to future injection sites on the patient. Moreover, the location of the markers on the body of the doll may be selected based on the available injection sites on the patient in accordance with the injection regimen and based on the relative fleshiness of the available injection sites on the patient, such that the those injection sites having higher fleshiness are selected more frequently than those injection sites having lower fleshiness. At step 630, medication is administered to the selected injection site on the patient. Then, at step 640, one of the needles is inserted into the body of the doll at an insertion location corresponding to the selected injection site of on the patient. This process 600 is repeated in accordance with the particular injection regimen of the patient.

Although the present invention has been described with reference to specific embodiments, those skilled in the art will recognize that changes may be made in form and detail without departing from the spirit and scope of the invention.

What is claimed is:

1. A doll reminder system for keeping injection reminders in an injection regimen for a patient or caregiver, the doll reminder system comprising:

a plurality of reminder needles comprising distinctive needle thickness, needle length, or needle color, where said distinctive needle thickness. needle length, or needle color corresponds to distinct injections in the injection regimen of the patient; and a body including a head, torso, arms, and legs, the body having a stuffing filled therein, the body being configured to receive at least one of the plurality of reminder needles as said needle is inserted into the body at a insertion location, said insertion location corresponding to an injection site of the patient in accordance with said injection regimen, and the filling having sufficient density to accept and retain the plurality of reminder needles.

2. The doll of claim 1, wherein the body is shaped to form a stuffed animal.

3. The doll of claim 1, wherein the needles are a tracking of historical injection sites on the patient.

4. The doll of claim 1, wherein the needles are a tracking of future injection sites on the patient.

5. The doll of claim 1, wherein each of the plurality of needles includes a label or indicator including a plurality of details or information about the injection.

6. The doll of claim 5, wherein the plurality of details or information about the injection comprise a date, time, and type of injection.

7. The doll of claim 5, wherein the labels are shaped or colored differently to provide a visual indicator as to a date, time, or type of injection.

8. The doll of claim 1, wherein the body includes a plurality of markers indicating a plurality of future injection sites and medications in accordance with said injection regimen.

9. The doll of claim 8, wherein each of the plurality of markers includes a unique number to indicate a sequential order in which each of the plurality of future injections should be administered to the patient.

10. The doll of claim 8, wherein each of the plurality of markers is configured to accept one of the plurality of reminder needles therethrough to indicate that the injection to the patient is complete.

11. The doll of claim 8, wherein each of the plurality of markers includes labels or other indicators containing information about injections.

12. The doll of claim 11, wherein the information about the injection comprise a date or day of the week, time, and type of future injection.

13. A doll reminder system for keeping injection reminders in an injection regimen for a patient or caregiver, the doll reminder system comprising:

a plurality of reminder needles, each of the plurality of needles including a label or indicator including a plurality of details or information about an injection wherein the labels are shaped or colored differently to provide a visual indicator as to a date, time or type of injection; and a body including a head, torso, arms, and legs, the body having a stuffing filled therein, the body being configured to receive at least one of the plurality of reminder needles as said needle is inserted into the body at a insertion location, said insertion location corresponding to an injection site of the patient in accordance with said injection regimen, and the filling having sufficient density to accept and retain the plurality of reminder needles.

14. The doll reminder system of claim 13 wherein said plurality of reminder needles comprise distinctive needle thickness, needle length, or needle color, where said distinctive needle thickness, needle length, or needle color corresponds to distinct injections in the injection regimen of the patient.

15. The doll reminder system of claim 14, wherein the body is shaped to form a stuffed animal.

16. The doll reminder system of claim 13, wherein the needles are a tracking of historical injection sites on the patient.

17. The doll reminder system of claim 13, wherein the needles are a tracking of future injection sites on the patient.

18. The doll reminder system of claim 13, wherein the body includes a plurality of markers indicating a plurality of future injection sites and medications in accordance with said injection regimen.

19. The doll reminder system of claim 18, wherein each of the plurality of markers includes a unique number to indicate a sequential order in which each of the plurality of future injections should be administered to the patient.

20. The doll reminder system of claim 18, wherein each of the plurality of markers is configured to accept one of the plurality of reminder needles therethrough to indicate that the injection to the patient is complete.

21. The doll reminder system of claim 18, wherein each of the plurality of markers includes labels or other indicators including information about injections.

22. The doll reminder system of claim 21, wherein the information about the injection on the markers comprise a date or day of the week, time, and type of future injection.

* * * * *